US008966575B2

(12) United States Patent
McQuay et al.

(10) Patent No.: US 8,966,575 B2
(45) Date of Patent: Feb. 24, 2015

(54) METHODS, SOFTWARE, AND DEVICES FOR AUTOMATICALLY SCORING PRIVACY PROTECTION MEASURES

(71) Applicant: Nymity, Inc., Toronto (CA)

(72) Inventors: Terry McQuay, Toronto (CA); Eric Howard Lybeck, Eden Prairie, MN (US)

(73) Assignee: Nymity Inc., Toronto (CA)

( * ) Notice: Subject to any disclaimer, the term of this patent is extended or adjusted under 35 U.S.C. 154(b) by 0 days.

(21) Appl. No.: 13/715,958

(22) Filed: Dec. 14, 2012

(65) Prior Publication Data

US 2014/0173684 A1    Jun. 19, 2014

(51) Int. Cl.
  *G06F 21/00*    (2013.01)
  *G06F 21/12*    (2013.01)
  *H04L 29/06*    (2006.01)
  *G06F 21/62*    (2013.01)

(52) U.S. Cl.
  CPC .............. *G06F 21/121* (2013.01); *H04L 63/20* (2013.01); *G06F 21/6245* (2013.01); *G06F 21/6218* (2013.01)
  USPC .............................................. 726/1; 713/165

(58) Field of Classification Search
  CPC ..... H04W 12/02; H04W 12/04; H04W 12/06; H04L 63/20; H04L 63/0227; G06F 21/10; G06F 21/121; G06F 21/6245; G06F 21/6218
  USPC ....................... 726/1; 713/163, 165
  See application file for complete search history.

(56) References Cited

U.S. PATENT DOCUMENTS

| 2005/0086244 A1* | 4/2005 | Morinville ..................... 707/100 |
| 2007/0143851 A1* | 6/2007 | Nicodemus et al. ............ 726/25 |
| 2007/0180490 A1* | 8/2007 | Renzi et al. ....................... 726/1 |
| 2009/0320091 A1* | 12/2009 | Torres et al. ...................... 726/1 |
| 2010/0112983 A1* | 5/2010 | Walker et al. ................ 455/411 |
| 2010/0115582 A1* | 5/2010 | Sapp et al. ........................ 726/1 |
| 2011/0004914 A1* | 1/2011 | Ennis et al. ....................... 726/1 |
| 2013/0212683 A1* | 8/2013 | Sher-Jan et al. ................ 726/25 |

* cited by examiner

*Primary Examiner* — Hadi Armouche
*Assistant Examiner* — Sher Khan
(74) *Attorney, Agent, or Firm* — Klarquist Sparkman, LLP

(57) ABSTRACT

Methods, software and devices for scoring privacy protection processes implemented by an organization are disclosed. Implementation metrics and evidence indicators are received from units of the organization. Implementation metrics represent extent of implementation of one of the privacy protection processes. Evidence indicators each identify an electronic document providing evidence of extent of implementation of one of the privacy protection processes. Each electronic document is associated with at least one of the implementation metrics for which it provides supporting evidence. For each particular privacy protection process, unit, applicable privacy protection rules are identified and a user interface is provided to facilitate assessing compliance of that organizational unit with applicable privacy protection rules. The user interface presents applicable privacy protection rules, implementation metrics, and the electronic documents associated with those implementation metrics.

27 Claims, 12 Drawing Sheets

Organizational Unit 1

| Privacy Protection Process | Assigned Weight |
|---|---|
| Maintain Governance Structure | 8% |
| Maintain Personal Data Inventory | 8% |
| Maintain Data Privacy Policy | 8% |
| Maintain Operational Policies & Procedures | 8% |
| Ongoing Training & Awareness | 8% |
| Maintain Security Controls | 8% |
| Maintain Contracts | 8% |
| Maintain Notices | 8% |
| Manage Inquiries, Complaints & Disputes | 8% |
| Monitor for New Operational Practices | 7% |
| Incident Management | 7% |
| Monitor Data Handling Practices | 7% |
| Tracking External Criteria | 7% |

FIG. 6

Accountability Claims

[Submit] [Cancel]

Organizational Unit 1

| Privacy Protection Process | Weighting | Claims | Evidence | Goals | Evidence |
|---|---|---|---|---|---|
| Maintain Governance Structure | 7% | Defined 25% Date: 1/1/2010 | View Evidence | Implemented 100% Date: 6/1/2010 | View Evidence |
| | | Implemented 25% Date: 3/1/2010 | View Evidence | Mature 100% Date: 12/31/2010 | View Evidence |
| | | Add Claim [+] | | Add Goal [+] | |
| Maintain Personal Data Inventory | 7% | Defined 25% Date: 1/1/2010 | View Evidence | Implemented 100% Date: 6/1/2011 | View Evidence |
| | | | | Mature 100% Date: 12/31/2014 | View Evidence |
| | | Add Claim [+] | | Add Goal [+] | |
| Tracking External Criteria | 8% | Defined 25% Date: 1/1/2010 | View Evidence | Implemented 100% Date: 6/1/2011 | View Evidence |
| | | Implemented 100% Date: 3/1/2011 | View Evidence | Mature 100% Date: 12/31/2014 | View Evidence |
| | | Advanced 100% Date: 1/1/2012 | View Evidence | | |
| | | Add Claim [+] | | Add Goal [+] | |

FIG. 7

Add Evidence

| Evidence Title | |
|---|---|
| Evidence Description | |
| Evidence Type | ☐ Policy, Procedures or Guidelines  ☐ Legal Opinion<br>☐ Incident or Investigation Report ☐ Data Inventory<br>☐ Privacy Impact Assessment  ☐ Audit Report (External)<br>☐ Metrics & Measurements  ☐ Audit Report (Internal)<br>☐ Training Documentation  ☐ Other<br>☐ Action Plan Documentation |
| Effective Date | 01/01/2011 |
| Expiry Date | 01/01/2012 |
| Relevant Jurisdictions | ☐ United States  ☐ Latin America<br>☐ EMEA  ☐ Asia Pacific<br>☐ Canada |
| Search Terms | |
| Evidence Links | |
| Owner | select |

(Save)

FIG. 8

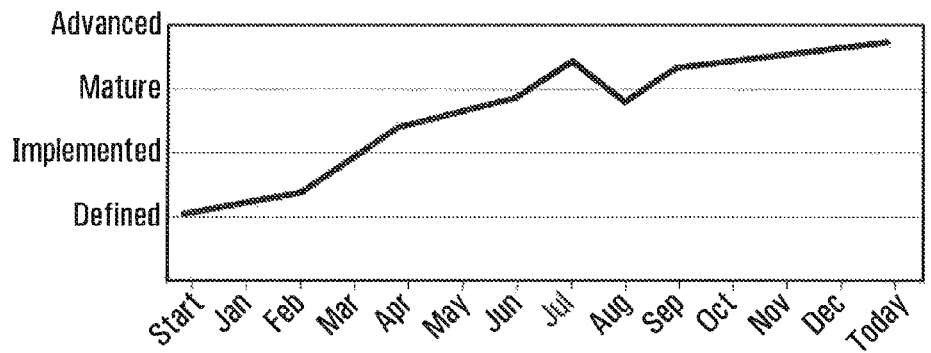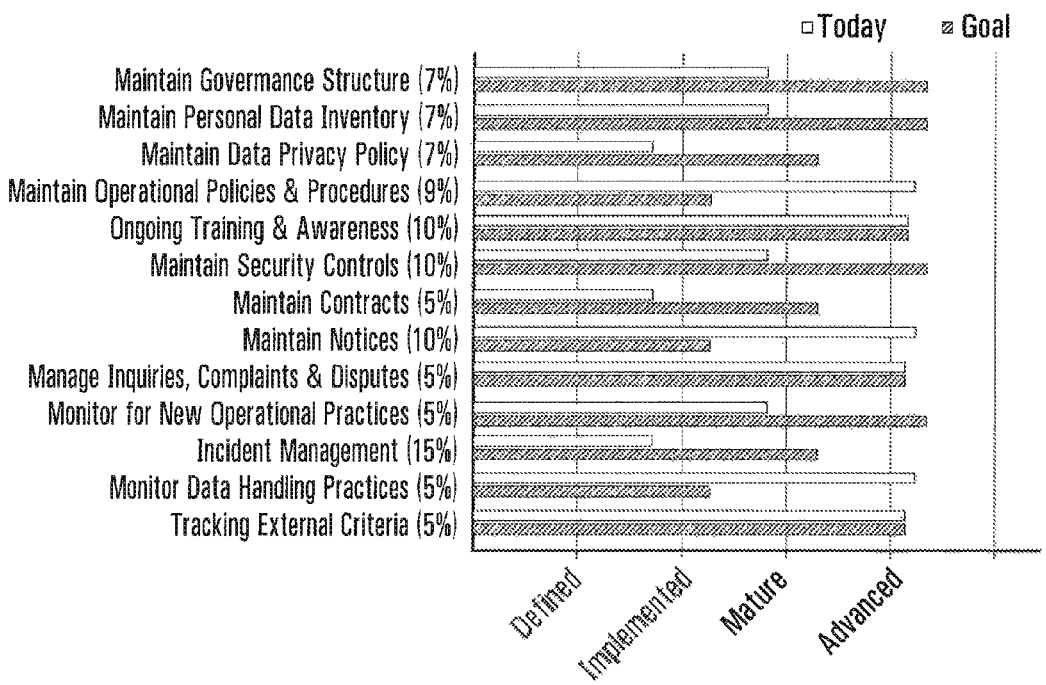
FIG. 9

| Organizational Unit 1 | | | | | |
|---|---|---|---|---|---|
| Privacy Protection Process | Maintain Governance Structure ▼ | | | | |
| Description [+] | | | | | |
| Evidence [+] | | | | | |

| Evidence Title | Evidence Description | Start Date | End Date | Path | Details |
|---|---|---|---|---|---|
| Global Privacy Policy (Employment Information) | Privacy Policy for protection of employee personal information | 01/01/2010 | | Link | Details |
| Privacy Policy (Switzerland) | Privacy Policy for protection of Switzerland personal data | 01/01/2010 | | Link | Details |

Accountability Claim Information [+]

| Claims | | | | Goals | | | |
|---|---|---|---|---|---|---|---|
| January 1, 2010 | Status | Defined | 25% | June 1, 2010 | Status | Implemented | 100% |
| January 1, 2010 | Assurance | Assertion | 100% | June 1, 2010 | Assurance | Self-Determ | 100% |
| January 1, 2010 | Risk | 5 | | June 1, 2010 | Risk | 1 | |
| March 1, 2010 | Status | Implemented | 100% | December 31, 2014 | Status | Mature | 100% |
| March 1, 2010 | Assurance | Self-Determ | 100% | December 31, 2014 | Assurance | Internal Val | 100% |
| March 1, 2010 | Risk | 1 | | | | | |
| Add Claim [+] | | | | Add Goal [+] | | | |

Rules Source - PIPEDA

| | Claim Date | Compliance Level | Evidence | Reference Reviewed | Reference Outstanding | |
|---|---|---|---|---|---|---|
| Schedule 1-4.1.1 Principle 1- Accountability-"Privacy Officer" | March 1, 2010 Add Claim [+] | High | Review Evidence | 2 | 4 | Review References |
| Division 1-Protection of Personal Information 6-"Organizational obligations" | March 1, 2010 Add Claim [+] | Confident | Review Evidence | 6 | 1 | Review References |
| Schedule 1, 4.1 Principle 1- Accountability/ | March 1, 2010 Add Claim [+] | Confident | Review Evidence | 3 | 0 | Review References |

FIG. 10

METHODS, SOFTWARE, AND DEVICES FOR AUTOMATICALLY SCORING PRIVACY PROTECTION MEASURES

TECHNICAL FIELD

This relates to scoring organizational privacy protection, and more particularly, to methods, software, and devices for automatically scoring privacy protection measures implemented by an organization.

BACKGROUND

In recent years, individuals, organizations and governments have grown increasingly aware of the importance of protecting personal privacy. As such, many organizations in both the public and private sectors have implemented privacy protection measures to ensure proper handling of personal information. Furthermore, many jurisdictions have enacted legislation to create rules governing handling of personal information. For example, in Canada, the Personal Information Protection and Electronic Documents Act (PIPEDA) provides a set of rules governing how private sector organizations may obtain, use or disclose personal information in the course of business.

An organization implementing privacy protection measures should routinely assess its implementation of those measures to ensure that privacy is effectively protected. An organization should also routinely assess its privacy protection measures against the requirements imposed by privacy protection legislation, to ensure that it is compliant with such legislation.

However, assessing an organization's implementation of the privacy protection measures and its compliance with privacy protection legislation may be challenging, especially for large organizations. For example, implementation of privacy protection measures may not be uniform throughout an organization. Exposure to personal privacy may vary throughout an organization. Operations may span different industries and/or different legal jurisdictions such that different privacy protection rules may apply to different parts of an organization. Thus, it may be difficult to obtain accurate assessments reflective of an organization as a whole.

SUMMARY

According to an aspect, there is provided a computer-implemented method of scoring a plurality of pre-defined privacy protection processes implemented by an organization organized as a plurality of organizational units. The method comprises: from each of the organizational units: receiving a plurality of implementation metrics, each representing extent of implementation of one of the pre-defined privacy protection processes by the organizational unit; and receiving a plurality of evidence indicators, each indicating an electronic document providing evidence of extent of implementation of at least one of the pre-defined privacy protection processes by the organizational unit. The method further comprises associating each of the electronic documents with at least one of the implementation metrics, the electronic document providing evidence supporting the at least one of the implementation metrics, and for each particular process of the plurality of pre-defined privacy protection processes implemented by each particular organizational unit of the plurality of organizational units: identifying applicable privacy protection rules from a plurality of privacy protection rules; providing a user interface to facilitate assessing compliance of the organizational unit with the applicable privacy protection rules. The user interface presents: the applicable privacy protection rules; those implementation metrics received for the particular organizational unit implementing the particular process; and a plurality of links to the electronic documents associated with those implementation metrics.

According to another aspect, there is provided a computing device for scoring a plurality of pre-defined privacy protection processes implemented by an organization organized as a plurality of organizational units. The computing device comprises: at least one processor; memory in communication with the at least one processor; and software code stored in the memory. The software code, when executed by the at least one processor, causes the computing device to: from each of the organizational units, receive a plurality of implementation metrics, each representing extent of implementation of one of the pre-defined privacy protection processes by the organizational unit; and receive a plurality of evidence indicators, each indicating an electronic document providing evidence of extent of implementation of at least one of the pre-defined privacy protection processes by the organizational unit. The software code, when executed, further causes the computing device to: associate each of the electronic documents with at least one of the implementation metrics, the electronic document providing evidence supporting the at least one of the implementation metrics; and for each particular process of the plurality of pre-defined privacy protection processes implemented by each particular organizational unit of the plurality of organizational units: identify applicable privacy protection rules from a plurality of privacy protection rules; provide a user interface to facilitate assessing compliance of the organizational unit with the applicable privacy protection rules. The user interface presents: the applicable privacy protection rules; those implementation metrics received for the particular organizational unit implementing the particular process; and a plurality of links to the electronic documents associated with those implementation metrics.

According to yet another aspect, there is provided a computer-readable medium storing instructions which when executed adapt a computing device to: from each of a plurality of organizational units of an organization, receive a plurality of implementation metrics, each representing extent of implementation of one of a plurality of pre-defined privacy protection processes by the organizational unit; and receive a plurality of evidence indicators, each indicating an electronic document providing evidence of extent of implementation of at least one of the pre-defined privacy protection processes by the organizational unit. The instructions, when executed, further adapt the computing device to associate each of the electronic documents with at least one of the implementation metrics, the electronic document providing evidence supporting the at least one of the implementation metrics; and for each particular process of the plurality of pre-defined privacy protection processes implemented by each particular organizational unit of the plurality of organizational units: identify applicable privacy protection rules from a plurality of privacy protection rules; provide a user interface to facilitate assessing compliance of the organizational unit with the applicable privacy protection rules. The user interface presents: the applicable privacy protection rules; those implementation metrics received for the particular organizational unit implementing the particular process; and a plurality of links to the electronic documents associated with those implementation metrics.

According to a further aspect, there is provided a computer-implemented method of reporting compliance of an organization with a plurality of privacy protection rules, the organization organized as a plurality of organizational units. The method comprises: from each of the organizational units, receiving a plurality of compliance metrics, each indicating a degree of confidence that the organizational unit complies with one of the plurality of privacy protection rules by implementing one of a plurality of pre-defined privacy protection processes; and receiving a plurality of evidence indicators, each indicating an electronic document providing evidence supporting at least one of the received compliance metrics. The method further comprises: calculating a combined compliance metric indicating a degree of confidence that the organization complies with the plurality of privacy protection rules, by combining the compliance metrics received from the organizational units, the combining taking into account importance of each of the organizational unit relative to others of the organizational units, and also taking into account importance of each of the pre-defined privacy protection processes relative to others of the pre-defined privacy protection processes; and generating an electronic report reporting compliance of the organization with the plurality of privacy protection rules. The electronic report comprises: the compliance metrics received from the organizational units; a plurality of links, each linking to one of the electronic documents indicated by the evidence indicators received from the organizational units; and the combined compliance metric.

According to a yet further aspect, there is provided a computing device for reporting compliance of an organization with a plurality of privacy protection rules, the organization organized as a plurality of organizational units. The computing device comprises: at least one processor; memory in communication with the at least one processor; and software code stored in the memory. The software code, when executed by the at least one processor, causes the computing device to: from each of the organizational units, receive a plurality of compliance metrics, each indicating a degree of confidence that the organizational unit complies with one of the plurality of privacy protection rules by implementing one of a plurality of pre-defined privacy protection processes; and receive a plurality of evidence indicators, each indicating an electronic document providing evidence supporting at least one of the received compliance metrics. The software code further causes the computing device to calculate a combined compliance metric indicating a degree of confidence that the organization complies with the plurality of privacy protection rules, by combining the compliance metrics received from the organizational units, the combining taking into account importance of each of the organizational unit relative to others of the organizational units, and also taking into account importance of each of the pre-defined privacy protection processes relative to others of the pre-defined privacy protection processes; and generate an electronic report reporting compliance of the organization with the plurality of privacy protection rules. The electronic report comprises: the compliance metrics received from the organizational units; a plurality of links, each linking to one of the electronic documents indicated by the evidence indicators received from the organizational units; and the combined compliance metric.

According to an even further aspect, there is provided a computer-readable medium storing instructions which when executed adapt a computing device to: from each of a plurality of organizational units of an organization, receive a plurality of compliance metrics, each indicating a degree of confidence that the organizational unit complies with one of a plurality of privacy protection rules by implementing one of a plurality of pre-defined privacy protection processes; and receive a plurality of evidence indicators, each indicating an electronic document providing evidence supporting at least one of the received compliance metrics. The instructions, when executed, further adapt the computing device to calculate a combined compliance metric indicating a degree of confidence that the organization complies with the plurality of privacy protection rules, by combining the compliance metrics received from the organizational units, the combining taking into account importance of each of the organizational unit relative to others of the organizational units, and also taking into account importance of each of the pre-defined privacy protection processes relative to others of the pre-defined privacy protection processes; and generate an electronic report reporting compliance of the organization with the plurality of privacy protection rules. The electronic report comprises: the compliance metrics received from the organizational units; a plurality of links, each linking to one of the electronic documents indicated by the evidence indicators received from the organizational units; and the combined compliance metric.

Other features will become apparent from the drawings in conjunction with the following description.

BRIEF DESCRIPTION OF THE DRAWINGS

In the figures, which illustrate example embodiments,

FIG. 6 illustrates an exemplary user interface for specifying relative importance of predefined privacy protection processes;

FIG. 7 illustrates an exemplary user interface for submitting claims and goals for an organization's implementation of privacy protection measures; and FIG. 8 illustrates an exemplary user interface for creating electronic records providing evidence to support submitted claims and goals;

FIG. 9 illustrates an exemplary user interface for presenting combined status metrics for an example organizational unit;

FIG. 10 illustrates an exemplary user interface for submitting claims for an organization's compliance with privacy protection rules;

DETAILED DESCRIPTION

Figure 1:
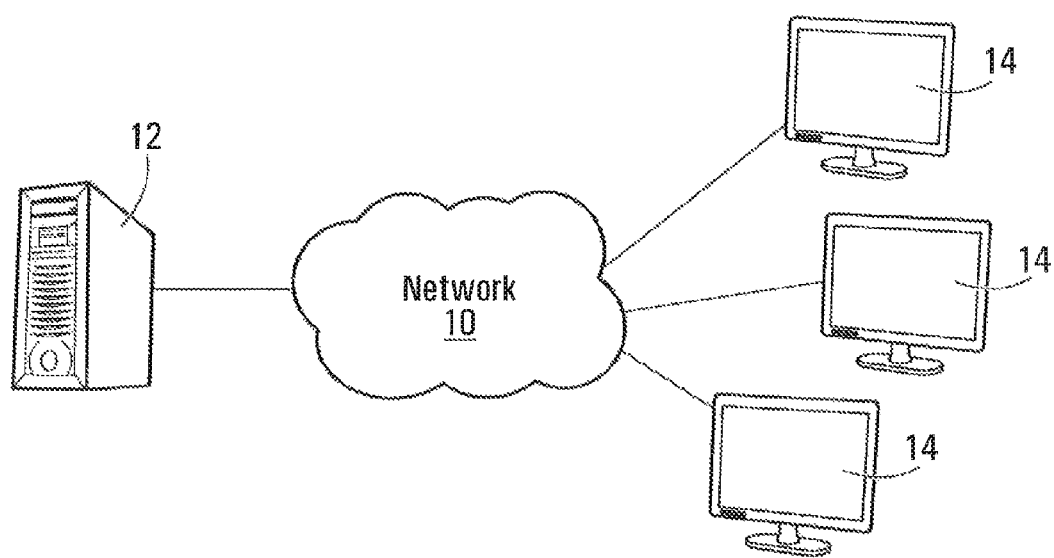
FIG. 1 is a network diagram illustrating a computer network, a server and end-user devices interconnected to the network, exemplary of an embodiment.

FIG. 1 illustrates a computer network and network interconnected server 12, exemplary of an embodiment. As will become apparent, server 12 is a computing device that includes software that facilitates submission of data regarding implementation of privacy protection measures and compliance with privacy rules from users throughout an organization, and calculates scores for such implementation and compliance, reflective of the organization as a whole.

As illustrated, server 12 is in communication with other computing devices such as end-user computing devices 14 through computer network 10. Network 10 may be the public Internet, but could also be a private intranet. So, network 10 could, for example, be an IPv4, IPv6, X.25, IPX compliant or similar network. Network 10 may include wired and wireless points of access, including wireless access points, and bridges to other communications networks, such as GSM/GPRS/3G/LTE or similar wireless networks. When network 10 is a public network such as the public Internet, it may be secured as a virtual private network.

Example end-user computing devices 14 are illustrated. End-user computing devices 14 are conventional network-interconnected computing devices used to access data and services through a suitable HTML browser or similar interface from network interconnected servers, such as server 12. As will become apparent, computing devices 14 are operated by users throughout an organization to interact with software executing at server 12. For example, computing devices 14 may be operated by users to submit data regarding an organization's implementation of privacy protection measures and the organization's compliance with privacy protection rules. Conveniently, when server 12 is interconnected with multiple computing devices 14, multiple users throughout the organization, e.g., situated in different organizational units, may submit data, thereby allowing data be compiled in collaborative fashion.

The architecture of computing devices 14 is not specifically illustrated. Each computing device 14 may include a processor, network interface, display, and memory, and may be a desktop personal computer, a laptop computing device, a network computing device, a tablet computing device, a personal digital assistant, a mobile phone, or the like. Computing devices 14 may access server 12 by way of network 10. As such, computing devices 14 typically store and execute network-aware operating systems including protocol stacks, such as a TCP/IP stack, and web browsers such as Microsoft Internet Explorer, Mozilla Firefox, Google Chrome, Apple Safari, or the like.

Figure 2:
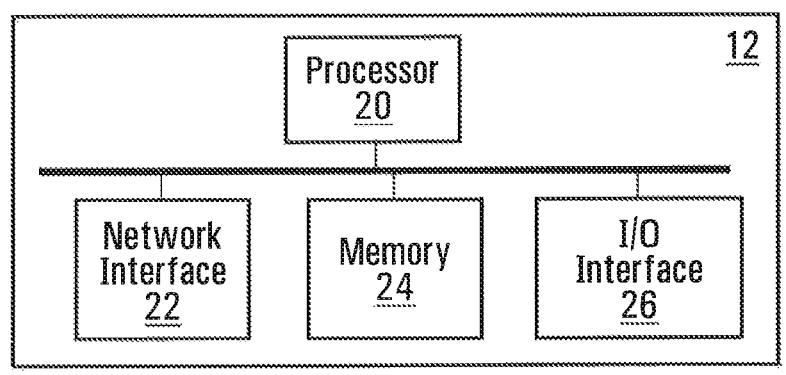
FIG. 2 is a high level block diagram of a computing device for use as the server of FIG. 1.

FIG. 2 is a high-level block diagram of a computing device that may act as server 12. As illustrated, server 12 includes one or more processors 20, network interface 22, a suitable combination of persistent storage memory 24, random-access memory and read-only memory, one or more I/O interfaces 26. Processor 20 may be an Intel x86, PowerPC, ARM processor or the like. Network interface 22 interconnects server 12 to network 10. Memory 24 may be organized using a conventional filesystem, controlled and administered by an operating system governing overall operation of server 12. Server 12 may store in memory 24, through this filesystem, software for receiving data from users regarding implementation/compliance, and for scoring implementation/compliance based on received data, as detailed below. Server 12 may include input and output peripherals interconnected to server 12 by one or more I/O interfaces 26. These peripherals may include a keyboard, display and mouse. These peripherals may also include devices usable to load software to be executed at server 12 into memory 24 from a computer readable medium.

Figure 3:
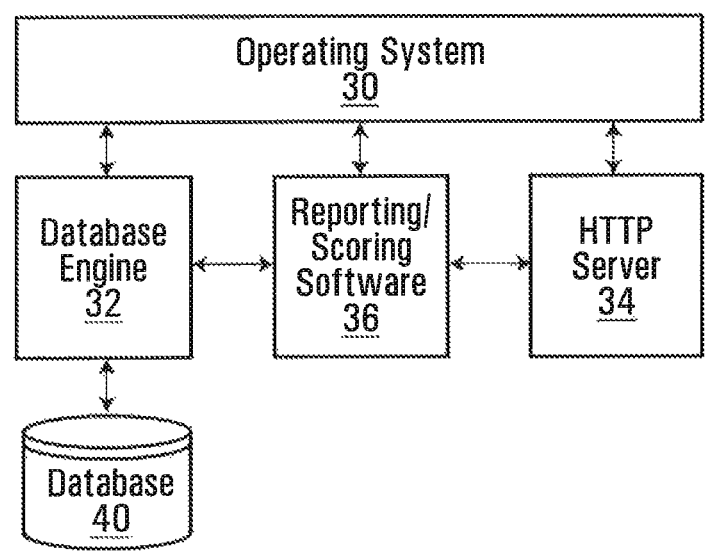
FIG. 3 illustrates the software organization of the server of FIG. 1.

FIG. 3 illustrates a simplified organization of example software components stored within memory 24 of server 12, as depicted in FIG. 2. As illustrated, software components includes operating system (OS) software 30, database engine 32, database 40, a hypertext transfer protocol ("HTTP") server application 34, and reporting/scoring software 36. Server 12 executes these software components to adapt it to operate in manners of embodiments, as detailed below. Database 40 may be stored in memory 24 of server 12.

OS software 30 may, for example, be a Unix-based operating system (e.g., Linux, FreeBSD, Solaris, OSX, etc.), a Microsoft Windows operating system or the like. OS software 30 allows reporting/scoring software 36 to access processor 20, network interface 22, memory 24, and one or more I/O interfaces 26 of server 12. OS software 30 may include a TCP/IP stack allowing server 12 to communicate with interconnected computing devices, such as computing devices 14, through network interface 22 using the TCP/IP protocol.

Database engine 32 may be a conventional relational or object-oriented database engine, such as Microsoft SQL Server, Oracle, DB2, Sybase, Pervasive or any other database engine known to those skilled in the art. Database engine 32 provides access to one or more databases 40, and thus typically includes an interface for interaction with OS software 30, and other software, such as reporting/scoring software 36. Database 40 may be a relational or object-oriented database. As will become apparent, database 40 stores records of parameters of organizations, parameters of reporting models, records of implementation/compliance reported by users, records of evidence supporting reported implementation/compliance, and records of privacy protection rules. In some embodiments, database 40 may also store records of reference documents providing guidance on how to comply with privacy protection rules. Reporting/scoring software 36 may access database 40 by way of database engine 32.

HTTP server application 34 is a conventional HTTP web server application such as the Apache HTTP Server, nginx, Microsoft IIS, or similar server application. HTTP server application 34 allows server 12 to act as a conventional HTTP server and provides a plurality of web pages of a web site, stored for example as (X)HTML or similar code, for access by interconnected computing devices such as computing devices 14. Web pages may be implemented using traditional web languages such as HTML, XHTML, Java, Javascript, Ruby, Python, Perl, PHP, Flash or the like, and stored in files 38 at server 12.

Reporting/scoring software 36 adapts server 12, in combination with database engine 32, database 40, OS software 30, and HTTP server application 34 to function in manners exemplary of embodiments, as detailed below. Reporting/scoring software 36 may include and/or generate user interfaces written in a language allowing their presentation on a web browser. These user interfaces may be provided in the form of web pages by way of HTTP server application 34 to computing devices 14 over network 10. As will be apparent, users of computing devices 14 may interact with these user interfaces to report data regarding the organization's implementation of privacy protection measures and the organization's compliance with privacy protection rules. These users may also interact with these or other user interfaces to receive results of scoring implementation/compliance.

To facilitate reporting and scoring of implementation/compliance, reporting/scoring software 36 adopts a model providing a set of predefined privacy protection processes. Such models are used to categorize privacy protection measures implemented by an organization, including polices, practices, procedures, activities, etc., as belonging to one of the predefined privacy protection processes. An organization's implementation of privacy protection measures may be then assessed according to its implementation of each of the predefined privacy protection processes. Similarly, an organization's compliance with privacy protection rules may be assessed according to compliance achieved by implementing each of the predefined privacy protection processes.

In an embodiment, a model used by reporting/scoring software 36 is the Nymity Data Privacy Reporting Model, published by Nymity Inc. (Toronto, Canada). This model includes thirteen predefined privacy protection processes. These processes are listed and described in Table I, below.

TABLE I

Example Privacy Protection Processes

| | Privacy Protection Process | Description |
|---|---|---|
| 1. | Maintain Governance Structure | Ongoing assurance that there are individuals responsible, accountable management, data privacy policy and management reporting procedures. |
| 2. | Maintain Personal Data Inventory | Maintain an inventory of the location of key personal data storage or personal data flows with defined classes of personal data. |
| 3. | Maintain Data Privacy Policy | Maintain a data privacy policy that meets legal requirements and operational risk tolerances. |
| 4. | Maintain Operational Policies & Procedures | Maintain operational policies and procedures consistent with data privacy policy, legal requirements and operational risk management. |
| 5. | Ongoing Training & Awareness | Ongoing training and awareness to promote compliance with data privacy policy and to mitigate operational risks. |
| 6. | Maintain Security Controls | Maintain an information security program based on legal requirements and ongoing risk assessments. |
| 7. | Maintain Contracts | Contracts and agreements with 3rd-parties and affiliates are maintained consistently with the data privacy policy, legal requirements and operational risk tolerances. |
| 8. | Maintain Notices | Notices to individuals affected are maintained consistently with the data privacy policy, legal requirements and operational risk tolerances. |
| 9. | Manage Inquiries, Complaints & Disputes | Maintain effective procedures and track interactions with individuals about their personal data. |
| 10. | Monitor for New Operational Practices | Monitor organizational practices to identify new processes or material changes in existing processes and ensure the principle of Data Privacy by Design. |
| 11. | Incident Management | Maintain an effective breach management program. |
| 12. | Monitor Data Handling Practices | Verify operational practices comply with the data privacy policy and operational policies and procedures. |
| 13. | Tracking External Criteria | Track new compliance requirements, expectations and best-practices. |

This model is exemplary only, and other models known to those skilled in the art may also be used.

Figure 4:
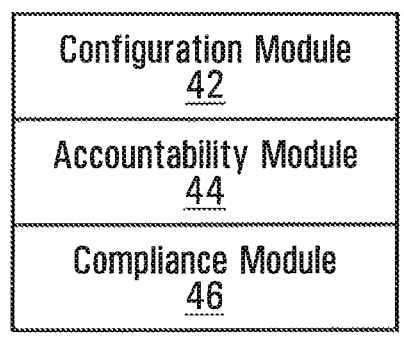
FIG. 4 is a high level block diagram of the modules of the reporting/scoring software of FIG. 3 executing at the server of FIG. 1.

In the embodiment depicted in FIG. 4, reporting/scoring software 36 includes configuration module 42, accountability module 44, and compliance module 46. These modules may be written using conventional computing languages such as C, C++, C#, Perl, JavaScript, Java, Visual Basic or the like. These modules may be in the form of executable applications, scripts, or statically or dynamically linkable libraries. The function of each of these modules is detailed below.

Configuration module 42 allows an administrator to configure various parameters of reporting/scoring software 36, as detailed below. To this end, configuration module 42 includes a set of user interfaces taking the form of one or more web pages. Configuration module 42 may receive parameters by way of network 10 from an administrator operating one of computing devices 14, or from an administrator operating server 12 directly.

Configuration module 42 includes user interfaces configured to allow an administrator to specify an organization's structure. In particular, these user interfaces allow an administrator to specify the organization's structure in terms of its constituent organizational units. As will be apparent, an organization may be organized into organizational units based on one or more of the following criteria: geography, legal jurisdiction, line of business, functional area, business process, management structure, etc. Other ways of organizing an organization into organizational units are possible, as will be apparent to those skilled in the art.

An organization's structure may be specified to have a single structural level (i.e., flat structure), allowing the structure to be specified as a list of organizational units. Alternatively, organizational units may be grouped or subdivided such that the organization's structure corresponds to a tree.

Figure 5A:
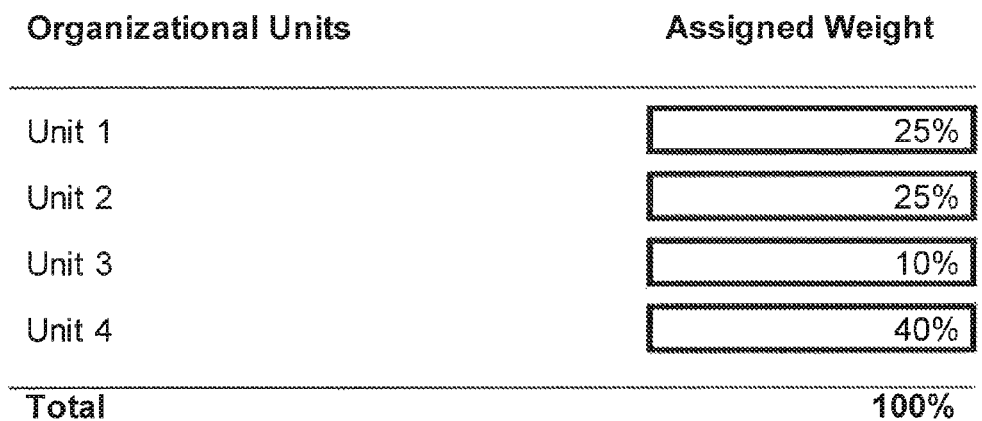
FIG. 5A and FIG. 5B each illustrate an exemplary user interfaces for specifying relative importance of organizational units.
Figure 5B:
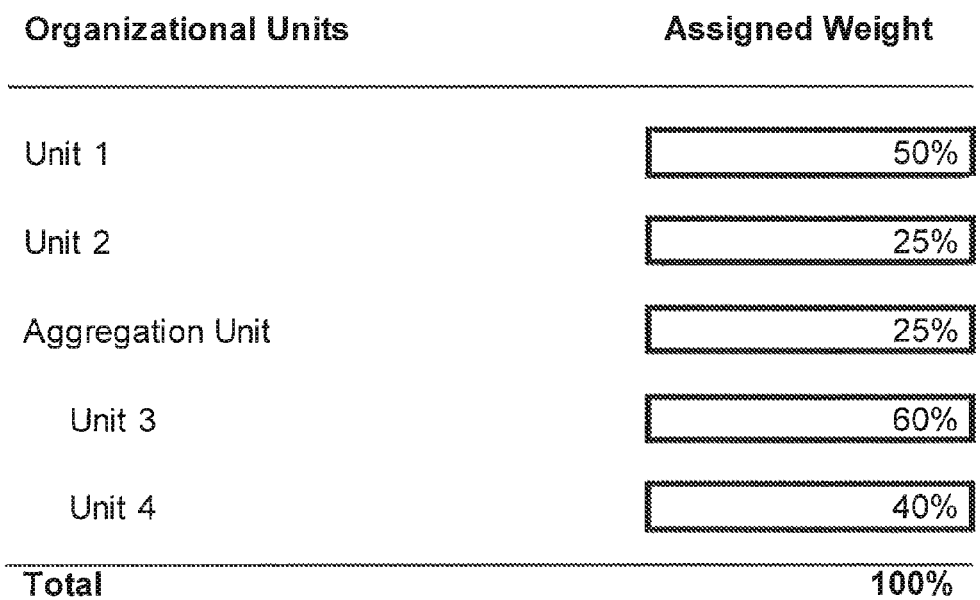

Configuration module 42 also includes user interfaces configured to allow an administrator to define the relative importance of organizational units. The relative importance of organizational units may be specified to reflect their relative size, relative financial importance, relative degree of exposure to personal information, etc. FIGS. 5A and 5B each depict a user interface for specifying the relative importance of organizational units, exemplary of an embodiment.

In particular, FIG. 5A depicts entry of percentage weights reflective of the relative importance of four organizational units of an example organization. The entered weights for the four organizational units sum to 100%. FIG. 5B depicts entry of percentage weights for another example organization, also having four organizational units. Unlike the example organization depicted in FIG. 5A, which has a flat structure, the example organization depicted in FIG. 5B has a tree structure. As depicted, Organizational Units 3 and 4 are grouped to form an Aggregation Unit. Within this Aggregation Unit, percentage weights of 60% and 40% have been entered for Organizational Units 3 and 4, respectively, which sum to 100%. For the organization as a whole, the percentage weights of Organizational Units 1, 2 and the Aggregation Unit also sum to 100%.

In some embodiments, configuration module 42 includes user interfaces configured to allow an administrator to modify the model used by reporting/scoring software 36. These user interfaces may allow an administrator to modify a pre-existing model such as the Nymity Data Privacy Reporting Model, for example, by adding or removing privacy protection processes. In some embodiments, configuration module 42 includes user interfaces configured to allow an administrator to select from amongst different pre-existing models. In some embodiments, configuration module 42 includes user interfaces configured to allow an administrator to define new models.

Configuration module 42 also includes user interfaces configured to allow an administrator to specify the relative importance of each pre-defined privacy protection process of the adopted model. The relative importance of each pre-defined privacy protection process is specified for each organizational unit. FIG. 6 depicts a user interface for specifying the relative importance of each pre-defined privacy protection process for an example organizational unit (Organizational Unit 1), exemplary of an embodiment. As depicted, percentage weights reflective of the relative importance of each of pre-defined privacy processes have been entered. Also as depicted, the pre-defined privacy protection processes are the thirteen processes described above in Table I. As will be appreciated, the percentage weight for a pre-defined privacy protection process may be set to 0%, signifying that the process is not applicable to the organizational unit.

Configuration module 42 also includes user interfaces configured to allow an administrator to specify characteristics of organizational units. For example, users may be allowed to specify an organizational unit's geographical location, legal jurisdiction, industry, etc. In some embodiments, configuration module 42 also includes user interfaces configured to allow an administrator to specify characteristics of an organization as a whole. For example, users may be allowed to specify whether the organization operates in the private or public sector, or whether the organization is publicly-owned, or privately-owned, etc.

In some embodiments, configuration module 42 may include user interfaces configured to allow an administrator to define privacy protection rules applicable to an organization as a whole, or to particular organizational units. Privacy protection rules may be selected to apply to an organization and/or organizational unit as a group, e.g., all of the privacy protection rules for a particular piece of legislation (also referred to as a rule source). Applicable privacy protection rules may also be selected individually.

In other embodiments, applicable privacy protection rules or rule sources may be automatically determined by compliance module 46 based on the specified characteristics for an organization or particular organizational units, as detailed below.

In some embodiments, configuration module 42 includes user interfaces configured to allow an administrator to specify identity and/or login credentials of the user or users responsible for reporting implementation/compliance data for each organizational unit. In these embodiments, user access to accountability module 44 and compliance module 46 may be secured using specified login credentials.

Configuration module 42 stores configuration parameters in database 40 by way of database engine 32.

Accountability module 44 allows users throughout an organization to submit data regarding the organization's implementation of privacy protection measures, according the pre-defined privacy protection processes of the adopted model. Each user submission may correspond to a claim or a goal, as detailed below.

Each claim includes a metric measuring an aspect of an organization's accountability in protecting personal information, and a date on which the metric applies. Accountability module 44 calculates scores for the organization's implementation of the pre-defined privacy protection processes based on submitted claims.

To this end, accountability module 42 includes a set of user interfaces configured to allow users to submit claims, and to present calculated scores to users. These user interfaces may take the form of one or more web pages. These web pages may be accessed by users operating computing devices 14.

Three types of metrics measuring different aspects of an organization's accountability in protecting personal information are defined.

A first type of metric measures the status of a pre-defined privacy protection process, i.e., the extent of implementation of one of said pre-defined privacy protection processes. Metrics of this first type may be referred to as implementation metrics.

Status of a pre-defined privacy protection process is assessed according the scale shown in Table II, below. For greater granularity, each of these scale values ("Defined", "Implemented" "Mature", "Advanced") may be used in conjunction with a percentage value. For example, possible metrics may be "50% Defined", "25% Implemented", "50% Mature", etc.

TABLE II

Example Scale for Measuring Status

| Status | Description |
| --- | --- |
| Defined | Process requirements are being defined. |
| Implemented | Process In place and controls are being implemented. |
| Mature | Controls in place and working effectively over time. |
| Advanced | Innovative controls in place within a mature program. |

A second type of metric measures the verifiability of implementation of a pre-defined privacy protection process. Metrics of this second type may be referred to as verifiability metrics. Verifiability may be assessed according to the example scale shown in Table III, below.

TABLE III

Example Scale for Measuring Verifiability

| Verifiability | Description |
| --- | --- |
| Unknown | No assurances can be made at this time. |
| Declaration (Undocumented claim) | Individuals responsible can provide an informed declaration based on their experience and knowledge. |

TABLE III-continued

Example Scale for Measuring Verifiability

| Verifiability | Description |
| --- | --- |
| Assertion (Document supported) | Individuals responsible can provide an assertion based on documentation and their experience and knowledge. |
| Self-Determination (Measure/Assessed) | Individuals responsible provide scheduled self-determination based on metrics and/or an assessment completed by the individuals responsible, to accountable management. |
| Internal Validation | Individuals within the organization, but not the individuals responsible, provide scheduled validation based on metrics and/or completed assessments to the individuals responsible and accountable management. |
| External Verification | A credible 3rd-party provides scheduled verification based on metrics and/or completed assessment to the individuals responsible, accountable management and potentially consumers via a Trustmark. |

A third type of metric measures a degree of risk that implementation of a pre-defined privacy protection processes by the organizational unit fails to protect privacy. Metrics of this third type may be referred to as risk metrics. Degree of risk is assessed according to a numerical scale between 1 and 9, where 1 represents a low degree of risk and 9 represents a high degree of risk.

The three types of metrics described above are exemplary only. Other types of metrics measuring other aspects of an organization's accountability in protecting personal information will be apparent to those skilled in the art. The described scales for each of these three types of metrics are also exemplary only, and other suitable scales will be apparent to those skilled in the art.

As noted, accountability module 44 includes user interfaces configured to allow users to submit claims including metrics measuring aspects of an organization's accountability in protecting personal information. Each claim includes an implementation metric, verifiability metric, or risk metric, as assessed for a particular organizational unit and a particular pre-defined privacy protection process. Claims may be submitted collaboratively by users situated throughout the organization, e.g., in each of the organizational units.

In some embodiments, accountability module 44 also includes user interfaces configured to allow users to submit goals representative of a desired value for an implementation metric, verifiability metric, or risk metric at a future date. Like claims, goals are submitted for a particular organizational unit and a particular pre-defined privacy protection process.

FIG. 7 depicts a user interface of accountability module 44 configured to allow users to submit claims and goals, exemplary of an embodiment. As depicted, claims have been entered for three different pre-defined privacy protection processes: "Maintain Governance Structure", "Maintain Personal Data Inventory", and "Tracking External Criteria." As depicted, each claim includes the date to which the included metric applies. As depicted, goals have also been entered for those processes, along with the future dates for those goals.

Accountability module 44 also includes user interfaces configured to allow users to create electronic records providing evidence supporting one or more submitted claims or goals. Electronic records may provide evidence in the form of a link to an online document containing evidence, or an identifier of a physical document containing evidence. For example, a document prepared by an external auditor may constitute evidence supporting a claim including a verifiability metric with a value of "External Validation." Similarly, a document prepared by a network security engineer indicating a high risk of data breach may constitute evidence supporting a claim including a risk metric with a high value (e.g., 9).

FIG. 8 depicts a user interface of accountability module 44 for creating an electronic record providing evidence, exemplary of an embodiment. As depicted, this user interface may be used to enter a title for the evidence, a description, a type, a link to the document containing the evidence when the document is in electronic form, etc.

Each of these electronic records provides evidence supporting one or more submitted claims or goals. As such, accountability module 44 also includes user interfaces configured to allow users to associate electronic records providing evidence with supported claims or goals. As depicted in FIG. 7, electronic records providing evidence associated with a particular claim or goal may be reviewed as desired by clicking on the "View Evidence" link adjacent each claim/goal.

Accountability module 44 calculates scores reflective of accountability in protecting personal information for each organizational unit or the organization as a whole, based on submitted claims. In particular, accountability module 44 calculates a combined implementation metric reflective of the extent of implementation of all of the pre-defined privacy protection processes by each organizational unit. Accountability module 44 also calculates a combined implementation metric reflective of the extent of implementation of all of the pre-defined privacy protection processes by the organization as a whole. Similarly, combined verifiability metrics and combined risk metrics are also calculated for each organizational unit, and for the organization as a whole.

To calculate a combined implementation metric for a particular organizational unit, accountability module 44 determines the most recently dated claim for each of the pre-defined privacy protection processes, for that organizational unit. For each of these claims, the included implementation metric is converted to a numerical value. Specifically, each implementation metric is converted to a numerical value between 0 to 400, where 100=Defined, 200=Implemented, 300=Mature, and 400=Advanced. Values in between these are also possible; for example, 50=50% Defined, 150=50% Implemented, 250=50% Mature, and 350=50% Advanced, etc.

The combined implementation metric for an organizational unit is calculated as the weighted sum of numerical values of the implementation metrics for each of the pre-defined privacy protection processes, where the weights are those specified for the pre-defined privacy protection processes using configuration module 42. After a combined implementation metric has been calculated for each organizational unit, these combined implementation metrics may be further combined to arrive at an overall implementation metric for the organization as a whole. This overall implementation metric is calculated as the weight sum of the combined implementation metrics for each of the organizational units, where the weights are those specified for the organizational units using configuration module 42.

Combined verifiability metrics and risk metrics for each organizational unit and the organization as a whole may be similarly calculated. Each verifiability metric may be converted to a numerical value between 1 and 6, where 1=Unknown, 2=Declaration, 3=Assertion, 4=Self-Determination, 5=Internal Validation, and 6=External Verification.

Risk metrics are specified by users as a numerical value, and thus no conversion is necessary.

Combined implementation metrics, verifiability metrics and risk metrics for each organizational unit and the organization as a whole may also be calculated based on submitted goals.

In some embodiments, a series of combined metrics (implementation, verifiability or risk) may be calculated for a series of points in time to ascertain changes over time. For each point in time, a combined metrics may be calculated taking into account those metrics that are most current for that point in time.

Accountability module 44 also includes user interfaces configured to graphically represent metrics from submitted claims and goals, as well as combined implementation metrics, combined verifiability metrics, and combined risk metrics. FIG. 9 depicts such a user interface, exemplary of an embodiment. As depicted, the most recent implementation metrics for each pre-defined privacy protection process implemented by an example organizational unit (Organizational Unit 1) are graphically represented in the form of bar graphs. Implementation metrics from claims are presented alongside implementation metrics from goals to facilitate ready comparison. FIG. 9 also depicts a combined implementation metric calculated for Organizational Unit 1 having a value of 280 (shown as 80% Mature), FIG. 9 also depicts a graph showing change in combined implementation metrics over time.

Accountability module 44 stores submitted claims, goals, metrics and records of evidence in database 40 by way of database interface 32.

Compliance module 46 allows users throughout an organization to submit claims regarding the organization's compliance with privacy protection rules, according to the pre-defined privacy protection processes of the adopted model, and calculates scores for the organization's compliance based on submitted claims.

Compliance module 46 identifies privacy protection rules applicable to each organizational unit. Applicable privacy protection rules may be identified based on selections made by an administrator using configuration module 42. Alternatively, applicable privacy protection rules may be identified by searching a data store of privacy protection rules using criteria formed from characteristics of the organizational units, as specified by an administrator using configuration module 42. For example, compliance module 46 may search the data store to identify privacy protection rules applicable to an organizational unit that is in the private sector, and located in Canada. The result of this example search may, for example, be all of the privacy protection rules provided by the Canadian Personal Information Protection and Electronic Documents Act (PIPEDA).

In some embodiments, this data store of privacy protection rules may be accessed through the PrivaWorks service operated by Nymity Inc. (Toronto, Canada). In some embodiments, this data store may be stored within database 40.

Compliance module 46 also determines privacy protection rules applicable to each of the pre-defined privacy protection processes. Applicable privacy protection rules may be determined by searching a data store containing mappings of particular rules to particular privacy protection processes. Example mappings for several privacy protection rules provided by PIPEDA are shown in TABLE IV, below:

TABLE IV

Example Mapping of Privacy Protection Rules to Privacy Protection Processes

| Privacy Protection Rule | Privacy Protection Process |
|---|---|
| Application 4.01 - Business contact information | Maintain Data Privacy Policy |
| Application 4.1 (1)-(4) - *Access impacted by the Canada Evidence Act* | Manage Inquires, Complaints and Disputes |
| Division 1 - Protection of Personal Information 5 - *Reasonable Person Test* | None |
| Division 1 - Protection of Personal Information 6 - *Organizational obligations* | Maintain Governance Structure |
| Division 1 - Protection of Personal Information - 6.1 Valid consent | Maintain Notices |
| Division 1 - Protection of Personal Information 7 (1) - *Collection without consent* | Maintain Data Privacy Policy |
| Division 1 - Protection of Personal Information 7 (2) - *Use without consent* | Maintain Data Privacy Policy |
| Division 1 - Protection of Personal Information 7 (3) - *Disclosure without consent* | Maintain Data Privacy Policy |
| Division 1 - Protection of Personal Information 7 (4) - *Use without consent permitted* | Maintain Data Privacy Policy |
| Division 1 - Protection of Personal Information 7 (5) - *Disclosure without consent permitted* | Maintain Data Privacy Policy |

Compliance module 46 identifies reference documents providing guidance on how to comply with applicable privacy protection rules. Relevant reference documents may be identified by searching a data store of reference documents using applicable privacy protection rules. For example, a search of privacy protection rule "Schedule 1—4.4.2 Principle 4—Limiting Collection—Fair and lawful means" of PIPEDA may return the following list of references:

1. Re: PIPEDA Complaint: Facebook—Philippa Lawson—Canadian Internet Policy and Public Interest Clinic;
2. PIPEDA Case Summary #2009-008—Report of Findings into the Complaint Filed by the Canadian Internet Policy and Public Interest Clinic (CIPPIC) against Facebook Inc.;
3. OPC Canada—PIPEDA Case Summary 91—Marketing Firm Accused of Improper Disclosure of Survey Information; and
4. Online Privacy Threats: A Review and Analysis of Current Threats—Canadian Internet Policy and Public Interest Clinic.

In some embodiments, this data store of reference documents may be accessed through the PrivaWorks service operated by Nymity Inc. (Toronto, Canada). In some embodiments, this data store may be stored within database 40.

Compliance module 46 includes user interfaces configured to allow users to assess compliance of the organization with applicable privacy protection rules, and submit compliance claims based on that assessment. These user interfaces may take the form of one or more web pages, which may be accessed by users operating computing devices 14.

Compliance module 46 facilitates assessment of compliance by presenting claims submitted by users to accountability module 42, the records of evidence created by users to support those claims, applicable privacy protection rules, and reference documents relevant to those privacy protection rules. Accountability claims and records of evidence are retrieved by compliance module 46 from database 40 by way of database interface 32.

FIG. 10 depicts one such user interface, exemplary of an embodiment, facilitating assessment of compliance of an example organizational unit (Organizational Unit 1) with applicable privacy protection rules, achieved by implementing a particular pre-defined privacy protection process ("Maintain Governance Structure"). As depicted, this user interface includes claims received by accountability module 44 for this particular organizational unit and this particular pre-defined privacy protection process. This user interface also indicates the electronic records of evidence associated with the depicted claims, and includes links to the electronic documents containing evidence.

Also as depicted in FIG. 10, this user interface includes privacy protection rules identified to be applicable to Organizational Unit 1 and the pre-defined privacy protection process "Maintain Governance Structure", as well as a link to references identified to be relevant to those privacy protection rules. In some embodiments, compliance module 46 maintains a record of which of those references have been reviewed, and when those references were reviewed.

The user interface depicted in FIG. 10 also allows users to submit compliance claims. Each claim includes a metric indicating a degree of confidence that a particular organizational unit complies with a particular privacy protection rule. Such metrics may be referred to as compliance metrics. Confidence of compliance is assessed to according to the following scale values: Unknown, Not Confident, Reasonable, Confident, and High. Each claim also includes the date to which the compliance metric applies. Claims may be submitted collaboratively by users situated throughout the organization, e.g., in each of the organizational units.

FIG. 10 depicts entry of three claims including compliance metrics, respectively indicating assessed compliance of Organizational Unit 1 with three privacy protection rules.

In some embodiments, compliance module 46 also includes user interfaces configured to allow users to submit compliance goals, each representative of a desired degree of confidence at a future date.

In some embodiments, compliance module 46 also includes user interfaces configured to allow users to create electronic records of evidence supporting compliance claims or goals, similar to the user interface of accountability module 44 depicted in FIG. 8. Such electronic records may be associated with one ore more compliance claims or goals. Electronic records of evidence created using by accountability module 44 may also be associated with one or more compliance claims or goals.

In some embodiments, compliance module 46 automatically calculates compliance metrics. For example, a compliance metric for a particular organizational unit may be calculated based on metrics reflective of accountability of that organizational unit in protecting personal information, e.g., the implementation metrics, verifiability metrics and risk metrics received for that organizational unit by accountability module 44. Automatically calculated compliance metrics may be presented to users for verification and/or modification.

Compliance module 46 calculates scores reflective of a degree of confidence that a particular organizational unit or the organization as a whole complies with applicable privacy protection rules, based on submitted compliance claims. For each claims, the included compliance metric is converted to a numerical value between 1 and 5, where 1=Unknown, 2=Not Confident, 3=Reasonable, 4=Confident, and 5=High.

A combined compliance metric for a particular organizational unit is calculated as the weighted sum of numerical values of compliance metrics submitted for each of the pre-defined privacy protection processes for that organizational unit, where the weights are those specified for the pre-defined privacy protection processes using configuration module 42. After a combined compliance metric has been calculated for each organizational unit, these combined compliance metrics may be further combined to arrive at an overall compliance metric for the organization as a whole. This overall compliance metric is calculated as the weight sum of the combined compliance metrics for each of the organizational units, where the weights are those specified for the organizational units using configuration module 42.

Combined compliance metrics for each organizational unit and the organization as a whole may also be calculated based on submitted compliance goals.

In some embodiments, a series of combined compliance metrics may be calculated for a series of points in time to ascertain changes over time. For each point in time, combined compliance metrics may be calculated taking into account those compliance metrics that are most current for that point in time.

Figure 11:
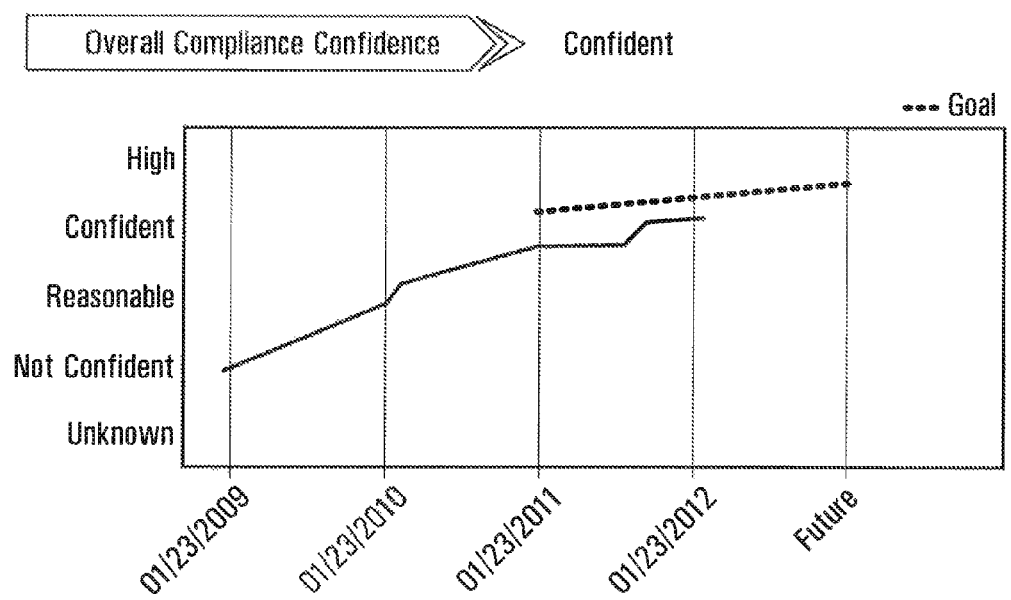
FIG. 11 illustrates an exemplary user interface for presenting combined compliance metrics for an example organization.

Compliance module 46 also includes user interfaces configured to present representations of compliance metrics from submitted claims and goals, as well as combined compliance metrics. These representations may include graphical representations, for example, as depicted in FIG. 11, exemplary of an embodiment. FIG. 11 depicts the overall compliance metric calculated for an organization, as well as a graph of overall compliance over a period of time. As depicted, this graph includes one data series calculated from submitted claims and one data series calculated from submitted goals.

These user interfaces may also present indicators of evidence provided by the electronic records of evidence associated with submitted compliance claims, as well as links to the electronic documents containing the evidence.

Collectively, these user interfaces present the results of assessing compliance with privacy protection rules reflective of an organization as a whole. As such, the content of these user interfaces may be used to generate a compliance report for the organization for presentation to stakeholders.

Compliance module 46 stores submitted claims, goals, metrics and records of evidence in database 40 by way of database interface 32.

Figure 12:
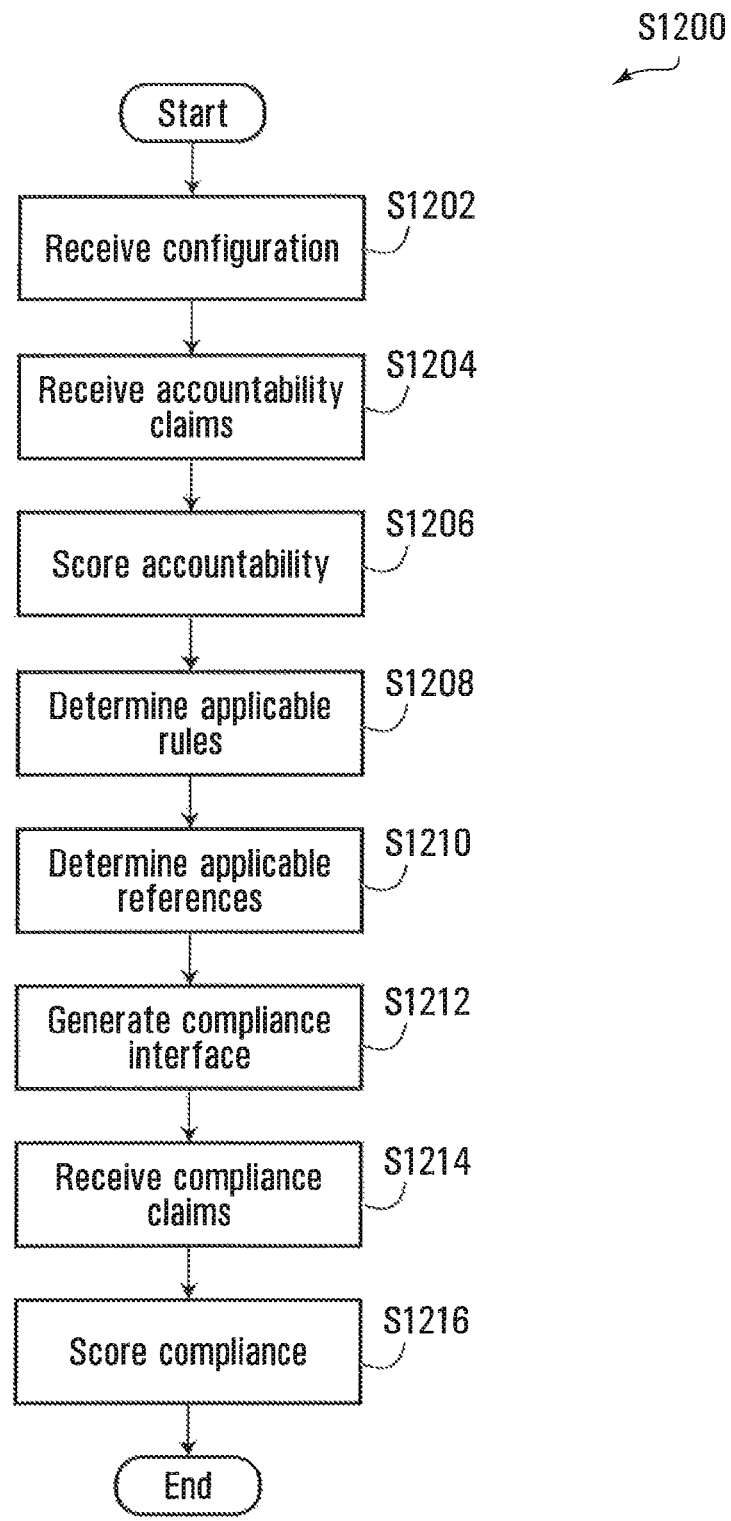
FIG. 12 is a flowchart depicting exemplary blocks performed by the reporting/scoring software of FIG. 3.

The operation of reporting/scoring software 36 is further described with reference to the flowchart illustrated in FIG. 12.

Reporting/scoring software 36 performs blocks S1200 and onward at server 12. At block S1202, configuration module 42 receives configuration parameters from an administrator. These configuration parameters include parameters describing organizational structure, e.g., the organization's constituent organizational units, as well as characteristics of the organization and its organizational units. These configuration parameters also include weights reflective of the relative importance of each organizational unit, which may be received by configuration module 42 by way of the user interface depicted in FIG. 5A (or FIG. 5B). These configuration parameters also include weights reflective of the relative importance of each pre-defined privacy protection process of the adopted reporting model for each organizational unit, which may be received by configuration module 42 by way of the user interface depicted in FIG. 6.

At block S1204, accountability module 44 receives claims and goals containing implementation metrics, verifiability metrics, and risk metrics from each organizational unit.

Claims and goals may be received by accountability module 44 by way of the user interface depicted in FIG. 7.

Accountability module 44 also receives electronic records providing evidence supporting one or more of the submitted claims or goals. Electronic records of evidence may be created using a user interface, as depicted for example in FIG. 8. Each electronic record of evidence is associated with those submitted claims or goals, for which that record provides evidentiary support. Next, at block S1206, accountability module 44 calculates combined implementation metrics, combined verifiability metrics and combined risk metrics based on received claims and goals.

At block S1208, compliance module 46 determines applicable privacy protection rules for each particular organizational unit implementing each particular pre-defined privacy protection process. At block S1210, compliance module 46 determines relevant references for each of the applicable privacy protection rules.

At block S1212, compliance module 46 presents a user interface to facilitate assessing the organization's compliance with applicable privacy protection rules. This user interface is populated with claims received by accountability module 44, and indicators of electronic records of evidence associated with those claims, as depicted for example in FIG. 10.

At block S1214, compliance module 46 receives claims and goals containing compliance metrics from each organizational unit. Additional electronic records providing evidence may be received. Each electronic record is associated with those submitted compliance claims and goals, for which the record provides evidentiary support. Finally, at block S1216, accountability module 44 calculates combined compliance metrics based on received claims and goals. Combined compliance metrics may be graphically presented to users, e.g., by way of the user interface shown in FIG. 11.

Of course, the above described embodiments are intended to be illustrative only and in no way limiting. The described embodiments are susceptible to many modifications of form, arrangement of parts, details and order of operation. For example, software (or components thereof) described at computing device 12 may be hosted at several devices. Software implemented in the modules described above could be implemented using more or fewer modules. For example, in some embodiments, accountability module 44 may be omitted. In such embodiments, users may submit compliance claims/goals without submitting accountability claims/goals.

The invention is intended to encompass all such modification within its scope, as defined by the claims.

What is claimed:

1. A computer-implemented method of scoring a plurality of pre-defined privacy protection processes implemented by an organization organized as a plurality of organizational units, said method comprising:
   from each of said organizational units:
      for each one of said plurality of pre-defined privacy protection processes
         receiving one or more metrics, each representing extent of implementation of said one of said pre-defined privacy protection processes by said organizational unit;
         collecting one or more evidence indicators, each identifying an electronic document providing evidence supporting implementation of said one of said pre-defined privacy protection processes by said organizational unit, or verifiability of implementation of said one of said plurality of pre-defined privacy protection processes by said organizational unit, or degree of risk that implementation of said one of said plurality of pre-defined privacy protection processes by said organizational unit fails to protect privacy;
      associating each of said electronic documents with at least one of said one or more metrics representing extent of implementation of one of said pre-defined privacy protection processes by said organizational unit, a metric of verifiability of implementation of one of said pre-defined privacy protection processes by said organizational unit, or a metric of the degree of risk that implementation of one of said pre-defined privacy protection processes by said organizational unit fails to protect privacy said electronic document providing evidence supporting implementation of at least one of said pre-defined privacy protection processes;
   for each of said organizational units:
      from at least one of said one or more metrics representing extent of implementation of one of said pre-defined privacy protection processes by said organizational unit, said metric of verifiability of implementation of one of said pre-defined privacy protection processes by said organizational unit, or said metric of the degree of risk that implementation of one of said pre-defined privacy protection processes by said organizational unit fails to protect privacy, calculating at least one of a combined metric of implementation of said plurality of privacy protection processes by said organizational unit, a combined metric of verifiability of implementation of said plurality of privacy protection processes by said organizational unit, or a combined metric of the degree of risk that implementation of said plurality of privacy protection processes by said organizational unit fails to protect privacy;
   for each particular process of said plurality of pre-defined privacy protection processes implemented by each particular organizational unit of said plurality of organizational units:
      identifying applicable privacy protection rules from a plurality of privacy protection rules;
      providing a user interface to facilitate assessing compliance of said organizational unit with said applicable privacy protection rules, said user interface presenting:
         said applicable privacy protection rules;
         those metrics received for said particular organizational unit implementing said particular process;
         a plurality of links to said electronic documents associated with those metrics; and
         at least one of a combined metric of implementation of said plurality of privacy protection processes by said organizational unit, a combined metric of verifiability of implementation of said plurality of privacy protection processes by said organizational unit, or a combined metric of the degree of risk that implementation of said plurality of privacy protection processes by said organizational unit fails to protect privacy.

2. The method of claim 1, wherein said facilitating comprises:
   calculating a plurality of compliance metrics, each representing a degree of confidence that one of said organizational units complies with one of said privacy protection rules by implementing one of said pre-defined privacy protection processes, said calculating taking into account at least said received metrics representing extent of implementation of said one of said pre-defined privacy protection processes by said organizational unit.

3. The method of claim 2, wherein said user interface further presents said plurality of calculated compliance metrics, for user confirmation.

4. The method of claim 1, further comprising:
identifying electronic publications providing information relevant to compliance with said applicable privacy protection rules from a database of electronic publications; and
wherein said user interface further presents a plurality of links to said identified electronic publications.

5. The method of claim 1, wherein said organization is organized into said plurality of organizational units by legal jurisdiction, line of business, functional area, business process, or management structure.

6. The method of claim 1, further comprising storing said electronic documents providing evidence.

7. The method of claim 1, wherein said user interface comprises an HTML document.

8. The method of claim 1, further comprising:
receiving a further plurality of implementation metrics, each indicating a desired extent of implementation of one of said pre-defined privacy protection processes by one of said organizational units, at a future point in time.

9. The method of claim 1, further comprising:
receiving a further plurality of verifiability metrics, each indicating a desired verifiability of implementation of one of said plurality of pre-defined privacy protection processes by one of said organizational units, at a future point in time.

10. The method of claim 1, further comprising:
receiving a further plurality of risk metrics, each indicating a desired degree of risk that implementation of one of said pre-defined privacy protection processes by one said organizational unit fails to protect privacy, at a future point in time.

11. The method of claim 1, further comprising:
receiving a plurality of compliance metrics, each representing a degree of confidence that one of said organizational units complies with one of said privacy protection rules by implementing one of said pre-defined privacy protection processes.

12. The method of claim 11, further comprising:
calculating a combined compliance metric indicating a degree of confidence that said organization complies with said plurality of privacy protection rules, by combining said received compliance metrics, wherein said combining takes into account importance of each of said organizational unit relative to others of said organizational units, and also takes into account importance of each of pre-defined privacy protection process relative to others of said pre-defined privacy protection processes.

13. A computing device for scoring a plurality of pre-defined privacy protection processes implemented by an organization organized as a plurality of organizational units, said computing device comprising:
at least one processor;
memory in communication with said at least one processor; and
software code stored in said memory, which when executed by said at least one processor causes said computing device to:
from each of said organizational units:
for each one of said plurality of pre-defined privacy protection processes:
receive one or more metrics, each representing extent of implementation of said one of said pre-defined privacy protection processes by said organizational unit;
collect one or more evidence indicators, each identifying an electronic document providing evidence supporting implementation of said one of said pre-defined privacy protection processes by said organizational unit, or verifiability of implementation of said one of said plurality of pre-defined privacy protection processes by said organizational unit, or degree of risk that implementation of said one of said plurality of pre-defined privacy protection processes by said organizational unit fails to protect privacy;
associate each of said electronic documents with at least one of said or more metrics representing extent of implementation of one of said pre-defined privacy protection processes by said organizational unit, a metric of verifiability of implementation of one of said pre-defined privacy protection processes by said organizational unit, or a metric of the degree of risk that implementation of one of said pre-defined privacy protection processes by said organizational unit fails to protect privacy said electronic document providing evidence supporting implementation of at least one of said pre-defined privacy protection processes;
for each of said organizational units:
from at least one of said one or more metrics representing extent of implementation of one of said pre-defined privacy protection processes by said organizational unit, said metric of verifiability of implementation of one of said pre-defined privacy protection processes by said organizational unit, or said metric of the degree of risk that implementation of one of said pre-defined privacy protection processes by said organizational unit fails to protect privacy, calculate at least one of a combined metric of implementation of said plurality of privacy protection processes by said organizational unit, a combined metric of verifiability of implementation of said plurality of privacy protection processes by said organizational unit, or a combined metric of the degree of risk that implementation of said plurality of privacy protection processes by said organizational unit fails to protect privacy;
for each particular process of said plurality of pre-defined privacy protection processes implemented by each particular organizational unit of said plurality of organizational units:
identify applicable privacy protection rules from a plurality of privacy protection rules;
provide a user interface to facilitate assessing compliance of said organizational unit with said applicable privacy protection rules, said user interface presenting:
said applicable privacy protection rules;
those metrics received for said particular organizational unit implementing said particular process;
a plurality of links to said electronic documents associated with those metrics; and
at least one of a combined metric of implementation of said plurality of privacy protection processes by said organizational unit, a combined metric of verifiability of implementation of said plurality of privacy protection processes by said organizational unit, or a combined metric of the degree of risk that implementation of said plurality of privacy protection processes by said organizational unit fails to protect privacy.

14. A non-transitory computer-readable medium storing instructions which when executed adapt a computing device to:
from each of a plurality of organizational units of an organization:
for each one of said plurality of pre-defined privacy protection processes:
receive one or more metrics, each representing extent of implementation of said one of said pre-defined privacy protection processes by said organizational unit;
collect one or more evidence indicators, each identifying an electronic document providing evidence supporting implementation of said one of said pre-defined privacy protection processes by said organizational unit, or verifiability of implementation of said one of said plurality of pre-defined privacy protection processes by said organizational unit, or degree of risk that implementation of said one of said plurality of pre-defined privacy protection processes by said organizational unit fails to protect privacy;
associate each of said electronic documents with at least one of said one or more metrics representing extent of implementation of one of said pre-defined privacy protection processes by said organizational unit, a metric of verifiability of implementation of one of said pre-defined privacy protection processes by said organizational unit, or a metric of the degree of risk that implementation of one of said pre-defined privacy protection processes by said organizational unit fails to protect privacy said electronic document providing evidence supporting implementation of at least one of said pre-defined privacy protection processes;
for each of said organizational units:
from at least one of said one or more metrics representing extent of implementation of one of said pre-defined privacy protection processes by said organizational unit, said metric of verifiability of implementation of one of said pre-defined privacy protection processes by said organizational unit, or said metric of the degree of risk that implementation of one of said pre-defined privacy protection processes by said organizational unit fails to protect privacy, calculate at least one of a combined metric of implementation of said plurality of privacy protection processes by said organizational unit, a combined metric of verifiability of implementation of said plurality of privacy protection processes by said organizational unit, or a combined metric of the degree of risk that implementation of said plurality of privacy protection processes by said organizational unit fails to protect privacy;
for each particular process of said plurality of pre-defined privacy protection processes implemented by each particular organizational unit of said plurality of organizational units:
identify applicable privacy protection rules from a plurality of privacy protection rules;
provide a user interface to facilitate assessing compliance of said organizational unit with said applicable privacy protection rules, said user interface presenting:
said applicable privacy protection rules;
those metrics received for said particular organizational unit implementing said particular process;
a plurality of links to said electronic documents associated with those metrics; and
at least one of a combined metric of implementation of said plurality of privacy protection processes by said organizational unit, a combined metric of verifiability of implementation of said plurality of privacy protection processes by said organizational unit, or a combined metric of the degree of risk that implementation of said plurality of privacy protection processes by said organizational unit fails to protect privacy.

15. A computer-implemented method of reporting compliance of an organization with a plurality of privacy protection rules, said organization organized as a plurality of organizational units, said method comprising:
from each of said organizational units:
for each one of said plurality of privacy protection rules:
receiving one or more compliance metrics, each indicating a degree of confidence that said organizational unit complies with said one of said plurality of privacy protection rules by implementing one of a plurality of pre-defined privacy protection processes;
receiving for each of said compliance metrics an indicator of a point in time to which said compliance metric applies;
collecting one or more evidence indicators, each identifying an electronic document providing evidence supporting compliance of said organizational unit with said one of said plurality of pre-defined privacy protection processes;
associating each of said electronic documents with at least one of said one or more compliance metrics;
for each of said organizational units:
from said one or more compliance metrics indicating a degree of confidence that said organizational unit complies with one of said plurality of privacy protection rules by implementing one of a plurality of pre-defined privacy protection processes, calculating a combined compliance metric indicating a degree of confidence that said organizational unit complies with said plurality of privacy protection rules, by combining said one or more compliance metrics, said combining taking into account importance of each of said pre-defined privacy protection processes relative to others of said pre-defined privacy protection processes;
from said combined compliance metrics indicating a degree of confidence that each of said organizational units complies with said plurality of privacy protection rules, calculating a combined metric of organizational compliance with said plurality of privacy protection rules said combining taking into account the importance of each of said organizational units relative to others of said organizational units; and
generating an electronic report reporting compliance of said organization with said plurality of privacy protection rules, said electronic report comprising:
said compliance metrics received from said organizational units;
a plurality of links, each linking to one of said electronic documents indicated by said evidence indicators received from said organizational units; and
said combined compliance metric.

16. The method of claim 15, further comprising:
receiving indicators of said importance of each of said organizational units relative to others of said organizational units.

17. The method of claim 15, further comprising:
for each of said organizational units, receiving indicators of said importance of each of said pre-defined privacy protection processes relative to others of said pre-defined privacy protection processes.

18. The method of claim 15, wherein said electronic report further comprises a further plurality of links, each linking to an electronic document containing one of said plurality of privacy protection rules.

19. The method of claim 15, wherein said electronic report further comprises said compliance metrics.

20. The method of claim 15, further comprising:
receiving a further plurality of compliance metrics, each indicating a desired degree of confidence that one of said organizational units complies with one of said plurality of privacy protection rules by implementing one of said plurality of pre-defined privacy protection processes, at a future point in time.

21. The method of claim 15, further comprising:
repeating said calculating said combined compliance metric for each of a plurality of points in time, taking into account those of said plurality of compliance metrics which apply to each of said plurality of points in time.

22. The method of claim 21, wherein said electronic report further comprises a graph showing said combined compliance metrics calculated for said plurality of points plotted against time.

23. The method of claim 15, wherein said organization is organized into said plurality of organizational units by legal jurisdiction, line of business, functional area, business process, or management structure.

24. The method of claim 15, further comprising storing said electronic documents providing evidence.

25. The method of claim 15, wherein said electronic report comprises an HTML document.

26. A computing device for reporting compliance of an organization with a plurality of privacy protection rules, said organization organized as a plurality of organizational units, said computing device comprising:
at least one processor;
memory in communication with said at least one processor; and
software code stored in said memory, which when executed by said at least one processor causes said computing device to:
from each of said organizational units:
for each of said plurality of privacy protection rules:
receive one or more compliance metrics, each indicating a degree of confidence that said organizational unit complies with said one of said plurality of privacy protection rules by implementing one of a plurality of pre-defined privacy protection processes;
receive for each of said compliance metrics an indicator of a point in time to which said compliance metric applies;
collect one or more evidence indicators, each identifying an electronic document providing evidence supporting compliance of said organizational unit with said one of said plurality of pre-defined privacy protection processes;
associate each of said electronic documents with at least one of said one or more compliance metrics;
for each of said organizational units:
from said one or more compliance metrics indicating a degree of confidence that said organizational unit complies with one of said plurality of privacy protection rules by implementing one of a plurality of pre-defined privacy protection processes, calculate a combined compliance metric indicating a degree of confidence that said organizational unit complies with said plurality of privacy protection rules, by combining said one or more compliance metrics, said combining taking into account importance of each of said pre-defined privacy protection processes relative to others of said pre-defined privacy protection processes;
from said combined compliance metrics indicating a degree of confidence that each of said organizational units complies with said plurality of privacy protection rules, calculate a combined metric of organizational compliance with said plurality of privacy protection rules said combining taking into the account importance of each of said organizational units relative to others of said organizational units; and
generate an electronic report reporting compliance of said organization with said plurality of privacy protection rules, said electronic report comprising:
said compliance metrics received from said organizational units;
a plurality of links, each linking to one of said electronic documents indicated by said evidence indicators received from said organizational units; and
said combined compliance metric.

27. A non-transitory computer-readable medium storing instructions which when executed adapt a computing device to:
from each of a plurality of organizational units of an organization:
for each of a plurality of privacy protection rules:
receive one or more compliance metrics, each indicating a degree of confidence that said organizational unit complies with said one of a plurality of privacy protection rules by implementing one of a plurality of pre-defined privacy protection processes;
receive for each of said compliance metrics an indicator of a point in time to which said compliance metric applies;
collect one or more evidence indicators, each identifying an electronic document providing evidence supporting compliance of said organizational unit with said one of said plurality of pre-defined privacy protection processes;
for each of said organizational units:
from said one or more compliance metrics indicating a degree of confidence that said organizational unit complies with one of said plurality of privacy protection rules by implementing one of a plurality of pre-defined privacy protection processes, calculate a combined compliance metric indicating a degree of confidence that said organizational unit complies with said plurality of privacy protection rules, by combining said one or more compliance metrics, said combining taking into account importance of each of said pre-defined privacy protection processes relative to others of said pre-defined privacy protection processes;
from said combined compliance metrics indicating a degree of confidence that each of said organizational units complies with said plurality of privacy protection rules, calculate a combined metric of organizational compliance with said plurality of privacy protection rules said combining taking into the account importance of each of said organizational units relative to others of said organizational units; and generate an electronic report reporting compliance of said organization with said plurality of privacy protection rules, said electronic report comprising:
- said compliance metrics received from said organizational units;
- a plurality of links, each linking to one of said electronic documents indicated by said evidence indicators received from said organizational units; and
- said combined compliance metric.

* * * * *